Patented July 21, 1931

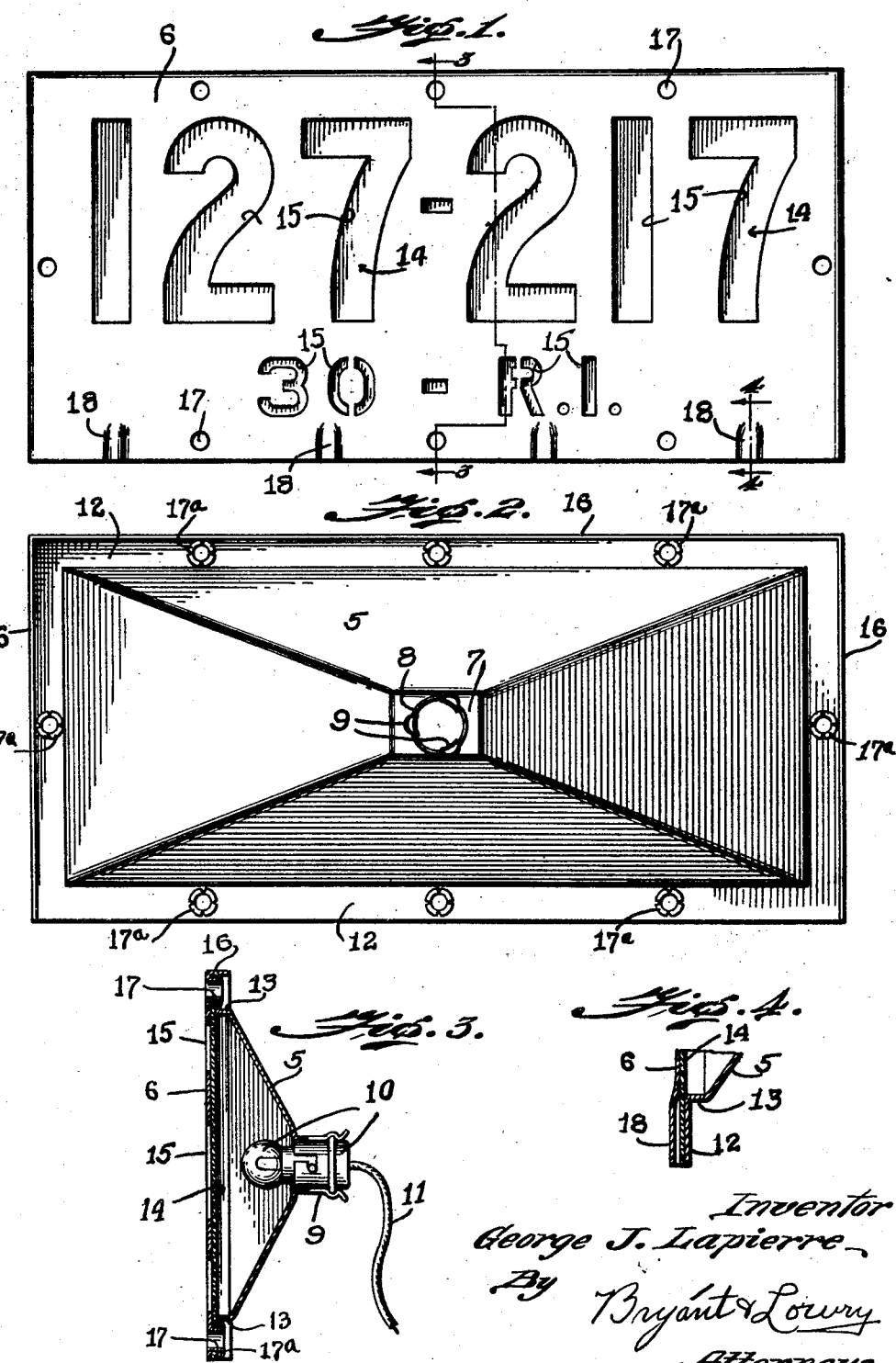

1,815,854

UNITED STATES PATENT OFFICE

GEORGE J. LAPIERRE, OF PAWTUCKET, RHODE ISLAND, ASSIGNOR OF ONE-HALF TO GEORGE V. MORIN, OF PAWTUCKET, RHODE ISLAND

ILLUMINATED LICENSE PLATE CONSTRUCTION

Application filed February 17, 1930. Serial No. 429,131.

This invention relates to certain new and useful improvements in an illuminated license plate construction.

The primary object of the invention is to provide an illuminated license plate construction designed as a unit and adapted for mounting upon a supporting bracket or other holder similar to the ordinary license plate that is usually formed of sheet metal with license indicia embossed thereon, the present device being in the form of a casing that is illuminated to render unnecessary the direct association of the license plate with a tail light for illuminating purposes.

A further object of the invention is to provide an illuminated license plate construction that is practically thief-proof in that tampering or mutilation thereof in an endeavor to change the numbers or license indicia will at once be apparent.

A still further object of the invention is to provide a license plate construction of the foregoing type embodying a rear dished wall and a front flat wall with an interposed translucent color screen flatly engaged with the front wall with spaced offset portions at the lower edge of the front wall to permit drainage of water that may collect in the license plate construction.

A still further object of the invention is to provide improvements in the general art to which the same relates and more particularly with reference to the U. S. patent granted to G. J. Lapierre and T. A. Gilligan on December 25, 1928, No. 1,696,804, the present invention providing a novel form of permanent connection between the edges of the rear dished wall and the front license plate wall with an angle offset in the rear wall inwardly of the edge thereof for the better reflection of light rays from a lamp within the device to insure illumination of the entire expanse of license indicia, the permanent connection between the walls being in the form of hollow rivets providing openings for the passage of securing means by which the license plate construction may be attached to a bracket or other support.

With the above and other objects in view that will become apparent as the nature of the invention is better understood, the same consists in the novel construction, combination and arrangement of parts to be hereinafter more fully described and then claimed.

In the accompanying drawings which illustrate the preferred embodiment of the invention and to which reference is had by like characters designating corresponding parts throughout the several views;

Figure 1 is a front elevational view of an illuminated license plate construction built in accordance with the present invention, Figure 2 is a rear elevational view of the same showing the hollow rivet connection permanently uniting the front and rear walls of the device and the lamp socket disposed centrally of the rear wall, Figure 3 is a vertical cross sectional view taken on line 3—3 of Figure 1 showing the rear dished wall carrying the lamp, the flat front wall having the license indicia embodied therein and the translucent color screen interposed between the walls and flatly engaged with the front wall, and Figure 4 is a detail sectional view taken on line 4—4 of Figure 1 showing an offset at the lower edge of the front wall for drainage purposes and the marginal offset inwardly of the flanged edge of the rear wall.

Referring more in detail to the accompanying drawings, there is illustrated an illuminated license plate construction of elongated rectangular form similar to an ordinary license plate and comprised of rear and front walls 5 and 6 respectively. The rear wall 5 is of dished formation as shown in Figures 2 and 3 with the central portion thereof farthest from the plate 6 flattened as at 7 and having a central opening surrounded by a flange 8 from which spring fingers 9 project for the support of a lamp and socket 10 from which an electric conductor 11 extends for attachment to a source of electric energy and control switch. The outer edge of the rear dished wall 5 carries an outwardly directed flange 12 extended from a marginal angular offset portion 13 as shown in Figures 3 and 4.

A color screen 14 of translucent material in the form of a sheet is interposed between the walls of the device and is flatly engaged with the front wall 6, license indicia 15 being embodied in the front wall 6 in the form of cutout numbers and letters. The opposite ends and upper edge of the front plate 6 carry a rearwardly directed flange 16 overlying the ends and edges of the color sheet and rear wall to aid in preventing the seepage or entrance of water into the device.

The two walls and color screen are permanently connected together by the formation of hollow rivets now to be described and these hollow rivets provide openings through which fastening devices may be passed in attaching the license plate construction to a bracket or other support. Spaced openings are formed in the edges of the color screen 14 and flange 12 upon the rear dished wall 5 and openings punched through the edges of the front wall 6 in line with the aforesaid openings provide hollow rivets 17, the rear edges of which are swaged over as at 17a to overlie the walls of the openings in the flange 12 as shown in Figures 2 and 3 for permanently connecting the front and rear walls of the device together.

From the above detailed description, it is believed that the construction and use of the device will at once be apparent, it being noted that the casing structure embodies front and rear walls permanently connected together, with illuminating means for the casing detachably engaged with the rear wall and that the device is to take the place of the usual flat license plate generally associated with the rear light of a motor vehicle. The hollow rivet connection between the walls of the device provide for the passage of fastening device in attaching the same to a bracket or the like and in view of such permanent connection between the walls, it is practically impossible to separate them without detection for the purpose of changing or mutilating the license indicia that is formed by cutouts in the front wall. In view of the intimate contact between the marginal edges of the walls it is practically impossible for water to enter the casing structure, but should any moisture enter through the cutout license indicia, the same will seep downwardly between the stencil and translucent screen and be drained therefrom through the spaced offset portions 18 at the lower edge of the front wall 6 as shown in Figure 4. By the provision of the offset angle wall portion 13 inwardly of the edge flange 12 upon the rear wall 5, acute angles at this point are eliminated so that light rays emanating from the lamp 10 are reflected over the entire expanse of license indicia with the result that the license numbers or characters adjacent the ends of the front wall 6 are as brightly illuminated as the ones directly in line with the lamp.

While there is herein shown and described the preferred embodiment of the invention, it is to be understood that minor changes may be made in the details of construction, such as will fall within the scope of the invention as claimed.

I claim:—

In an illuminated license plate construction, front and rear walls disposed adjacent each other at their edges and spaced from each other inwardly of the edges, the rear wall being fashioned to receive a lamp, cutout license indicia embodied in the front plate, an imperforate color screen of pyrolin interposed between the walls and adjacent edges thereof, a permanent connection between the edges of the walls, and offset portions at the lower edge of the front wall to permit drainage of water from the space between the front wall and screen, the rear wall having a portion adjacent the edge directed at right angles from the front wall insuring illumination of the entire expanse of license indicia.

In testimony whereof I affix my signature.

GEORGE J. LAPIERRE.